US010690583B2

(12) United States Patent
Tahara (10) Patent No.: US 10,690,583 B2
(45) Date of Patent: Jun. 23, 2020

(54) MICROPARTICLE MEASURING DEVICE AND MICROPARTICLE MEASURING METHOD

(71) Applicant: SONY CORPORATION, Tokyo (JP)

(72) Inventor: Katsutoshi Tahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/328,112

(22) PCT Filed: Jun. 27, 2017

(86) PCT No.: PCT/JP2017/023465
§ 371 (c)(1),
(2) Date: Feb. 25, 2019

(87) PCT Pub. No.: WO2018/047442
PCT Pub. Date: Mar. 15, 2018

(65) Prior Publication Data
US 2019/0195772 A1    Jun. 27, 2019

(30) Foreign Application Priority Data

Sep. 12, 2016 (JP) .................................. 2016-177555

(51) Int. Cl.
*G01N 15/14* (2006.01)
(52) U.S. Cl.
CPC ......... *G01N 15/1429* (2013.01); *G01N 15/14* (2013.01); *G01N 2015/1493* (2013.01)
(58) Field of Classification Search
CPC ..... G01N 2015/1006; G01N 2015/149; G01N 15/1484; G01N 15/1434; G01N 15/1459;
(Continued)

(56) References Cited

U.S. PATENT DOCUMENTS

2007/0257215 A1*  11/2007  Rich ................. G01N 15/1404
                                                  250/574
2009/0316151 A1*  12/2009  Matula .............. G01N 15/1459
                                                  356/338
(Continued)

FOREIGN PATENT DOCUMENTS

CN          101893569 A        11/2011
CN          102472705 A         5/2012
(Continued)

OTHER PUBLICATIONS

International Search Report and Written Opinion of PCT Application No. PCT/JP2017/023465, dated Sep. 19, 2017, 11 pages of ISRWO.

*Primary Examiner* — Michael P Stafira
(74) *Attorney, Agent, or Firm* — Chip Law Group (57) ABSTRACT

The present technology provides a technology of improving measurement efficiency in microparticle measurement for optically measuring a characteristic of a microparticle. For this, in the present technology, there is provided a microparticle measuring device and the like provided with a detecting unit which detects light from a microparticle sent from one of a plurality of containers containing microparticles, and an information processing unit which controls to specify a feature amount related to a detection number in a certain time section on the basis of information detected by the detecting unit, determine that the feature amount is abnormal on the basis of a predetermined threshold, and finish detection for the one container.

16 Claims, 7 Drawing Sheets

(58) Field of Classification Search
CPC .......... G01N 15/1429; G01N 33/573; G01N 33/569; G01N 2015/1081; G01N 21/76; G01N 2333/9015; G01N 33/54326; G01N 15/10; G01N 15/1404; G01N 15/1425; G01N 15/1436; G01N 15/147; G01N 1/10; G01N 1/20; G01N 1/38; G01N 2001/1031; G01N 2015/0288; G01N 33/4833; G01N 33/487; G01N 33/582; G01N 35/0098; G01N 15/14; G01N 15/1463; G01N 2021/6439; G01N 33/48721; G01N 33/56966; G01N 33/56972; G01N 15/0255; G01N 15/1475; G01N 1/4077; G01N 2015/1415; G01N 2015/144; G01N 2015/1481; G01N 2015/1493; G01N 2021/0346; G01N 2021/0357; G01N 2021/6463; G01N 2035/00326; G01N 2035/00495; G01N 21/03; G01N 21/11; G01N 21/253; G01N 21/47; G01N 21/4788; G01N 21/51; G01N 21/55; G01N 21/645; G01N 2458/10; G01N 2570/00; G01N 2800/164; G01N 2800/26; G01N 33/48735; G01N 33/50; G01N 33/5005; G01N 33/5308; G01N 33/542; G01N 33/543; G01N 33/54313; G01N 33/54353; G01N 33/5438; G01N 33/56911; G01N 33/56961; G01N 33/574; G01N 33/57484; G01N 33/68; G01N 33/86; G01N 35/0092; G01N 15/0612; G01N 15/1012; G01N 1/34; G01N 2001/4083; G01N 2001/4088; G01N 2015/0019; G01N 2015/0053; G01N 2015/0065; G01N 2015/1406; G01N 2015/1445; G01N 2015/1477; G01N 2015/1488; G01N 2021/1765; G01N 2021/513; G01N 2021/6417; G01N 2021/6441; G01N 2021/6482; G01N 2021/825; G01N 2030/8827; G01N 2035/1018; G01N 2035/103; G01N 2035/1034; G01N 2035/1048; G01N 21/00; G01N 21/0303; G01N 21/07; G01N 21/17; G01N 21/59; G01N 21/6428; G01N 21/6486; G01N 21/78; G01N 2333/245; G01N 2333/31; G01N 2333/40; G01N 2333/42; G01N 2333/46; G01N 2333/47; G01N 2333/4724; G01N 2333/575; G01N 2333/62; G01N 2333/70557; G01N 2333/70596; G01N 2333/71; G01N 2333/91188; G01N 2333/96463; G01N 2400/00; G01N 2500/00; G01N 27/27; G01N 27/3271; G01N 27/3272; G01N 27/44756; G01N 27/44791; G01N 2800/16; G01N 2800/222; G01N 2800/2821; G01N 2800/2835; G01N 2800/285; G01N 2800/52; G01N 2800/7014; G01N 30/88; G01N 33/48707; G01N 33/5091; G01N 33/5302; G01N 33/54306; G01N 33/54366; G01N 33/54393; G01N 33/555; G01N 33/564; G01N 33/566; G01N 33/567; G01N 33/56916; G01N 33/56938; G01N 33/56983; G01N 33/57492; G01N 33/57496; G01N 33/6803; G01N 33/6839; G01N 33/6845; G01N 33/6872; G01N 33/6896; G01N 33/74; G01N 33/743; G01N 33/80; G01N 33/82; G01N 33/92; G01N 35/00; G01N 35/08; G01N 35/10; G01N 35/1065; G01N 35/1079; G01N 35/1095

See application file for complete search history.

(56) References Cited

U.S. PATENT DOCUMENTS

| | | | |
|---|---|---|---|
| 2011/0069310 A1 | 3/2011 | Muraki et al. | |
| 2011/0076755 A1* | 3/2011 | Ebi | B01F 13/0818 435/287.3 |
| 2012/0134559 A1 | 5/2012 | Suzuki et al. | |
| 2012/0309636 A1* | 12/2012 | Gibbons | B01L 3/0275 506/9 |
| 2013/0302828 A1* | 11/2013 | Takeda | G01N 15/1459 435/7.23 |
| 2015/0068957 A1 | 3/2015 | Otsuka et al. | |
| 2015/0177113 A1 | 6/2015 | Nitta | |
| 2016/0377524 A1* | 12/2016 | Martin | G01N 35/1097 73/864.81 |
| 2017/0074775 A1 | 3/2017 | Akiyama et al. | |

FOREIGN PATENT DOCUMENTS

| | | |
|---|---|---|
| CN | 104169708 A | 11/2014 |
| CN | 104508455 A | 4/2015 |
| EP | 2461153 A1 | 6/2012 |
| EP | 2884257 A1 | 6/2015 |
| EP | 2950079 A1 | 12/2015 |
| JP | 2010-271168 A | 12/2010 |
| JP | 2013-044585 A | 3/2013 |
| JP | 2015-222202 A | 12/2015 |
| TW | 201531688 A | 8/2015 |
| WO | 2011/013595 A1 | 2/2011 |
| WO | 2014/024556 A1 | 2/2014 |
| WO | 2014/115409 A1 | 7/2014 |
| WO | 2015/064628 A1 | 5/2015 |
| WO | 2014/024556 A1 | 7/2016 |

* cited by examiner

MICROPARTICLE MEASURING DEVICE AND MICROPARTICLE MEASURING METHOD

CROSS REFERENCE TO RELATED APPLICATIONS

This application is a U.S. National Phase of International Patent Application No. PCT/JP2017/023465 filed on Jun. 27, 2017, which claims priority benefit of Japanese Patent Application No. JP 2016-177555 filed in the Japan Patent Office on Sep. 12, 2016. Each of the above-referenced applications is hereby incorporated herein by reference in its entirety.

TECHNICAL FIELD

The present technology relates to a microparticle measuring device and the like which optically measures a characteristic of a microparticle. More specifically, this relates to a microparticle measuring device and a microparticle measuring method for optically measuring a characteristic of a microparticle such as a cell.

BACKGROUND ART

In recent years, along with development of analytical methods, a method of allowing biological microparticles such as cells and microorganisms, microparticles such as microbeads and the like to flow through a flow path and individually measuring the microparticles and the like and analyzing or sorting the measured microparticles and the like at a step of allowing to flow.

As a representative example of such a method, technological improvement of an analytical method referred to as flow cytometry is advancing rapidly. The flow cytometry is an analytical method of analyzing and sorting the microparticles by allowing the microparticles to be analyzed to flow in a state arrayed in fluid and applying laser light and the like to the microparticles to detect fluorescence and scattered light emitted from each of the microparticles. A device used for this flow cytometry is called as a flow cytometer.

Furthermore, in recent years, full automation of a microparticle measuring device such as the flow cytometer is advancing; for example, a device which automatically samples from a plurality of containers (test tube, microtube, well and the like) holding different samples and measures is developed.

For such a device, for example, in Patent Document 1, a technology capable of suppressing mixture of other particles and analyzing the particles with a high degree of accuracy by providing a particle analyzing device including a flow cell provided with an introduction unit in which sample solution containing particles to be analyzed and sheath solution are introduced and a detecting unit through which a layer flow including the sample solution and sheath solution flows, a sample solution introducing member in which a suction nozzle arranged immediately below the flow cell so as to be movable in a forward direction and a backward direction with respect to a sample solution introducing direction to suck the sample solution and a sample solution introduction nozzle arranged in the introduction unit of the flow cell which discharges the sucked sample solution into the flow cell, and a movement restricting mechanism which restricts a movement amount of the sample solution introducing member.

CITATION LIST

Patent Document

Patent Document 1: Japanese Patent Application Laid-Open No. 2015-222202

SUMMARY OF THE INVENTION

Problems to be Solved by the Invention

In a conventional device, sample solution is put in a plurality of containers and measurement is often carried out continuously. In this case, the device is sometimes set to finish the measurement in the container when a detection (event) number from one container reaches a certain quantity. However, in a case where the detection number is set as a condition for finishing the measurement of each container, there is a problem that, if the device cannot recognize a behavior such as absence of the sample, unnecessary measurement data is taken and measurement takes time. Furthermore, if it takes a long time to measure the same container, there is also an adverse effect such as deterioration of unmeasured samples after that.

Furthermore, in a case where there is no sample in the container, air is sucked and a bubble is formed in a flow path. Due to the bubble, measurement data of the samples thereafter significantly varies, so that it is conceivable to wash for a long time after each sample measurement is finished, but in that case, there arises a problem that the measurement takes a long time.

Therefore, a main object of the present technology is to provide a technology of improving measurement efficiency in microparticle measurement for optically measuring a characteristic of the microparticle.

Solutions to Problems

In other words, in the present technology, first, there is provided a microparticle measuring device provided with a detecting unit which detects light from a microparticle sent from one of a plurality of containers containing microparticles, and an information processing unit which controls to specify a feature amount related to a detection number in a certain time section on the basis of information detected by the detecting unit, determine that the feature amount is abnormal on the basis of a predetermined threshold, and finish detection for the one container.

In the present technology, the information processing unit may control to display a warning in a case of determining abnormality.

Furthermore, in the present technology, in a case where the information processing unit determines abnormality a predetermined number of times, the information processing unit may control to finish the detection for the one container.

Moreover, in the present technology, the feature amount may be the detection number per unit time, and the information processing unit may determine abnormality in a case where the detection number per unit time is smaller than the predetermined threshold. In this case, the predetermined threshold may be a value specified on the basis of the detection number per unit time after a lapse of a predetermined time from detection start.

In addition, in the present technology, the information processing unit may determine that the abnormality is abnormality based on mixture of a bubble. In this case, the feature amount may be a ratio (R) per unit time of a waveform pulse in which a trigger time is detected above a predetermined threshold time (Tth) by the detecting unit, and the information processing unit may determine that the abnormality is based on the mixture of the bubble in a case where the ratio (R) exceeds the predetermined threshold. Furthermore, in this case, the predetermined threshold may be a value (Rth) determined in advance on the basis of a size of the microparticle to be measured.

The microparticle measuring device according to the present technology is further provided with a detection flow path through which the microparticle flows to be detected, and a drainage flow path connecting the detection flow path and a drainage container, in which the information processing unit may control to drain the bubble from the detection flow path and/or the drainage flow path to the drainage container in a case where the abnormality is the abnormality based on the mixture of the bubble.

Furthermore, in the present technology, in a case where the abnormality is abnormality based on the mixture of the bubble, the information processing unit may analyze the microparticle while eliminating information detected at the time of bubble detection and up to a time point a predetermined time before a bubble detection start time point from information detected by the detecting unit.

Moreover, in the present technology, the information processing unit may control to display that the detection is finished on the basis of abnormality for the one container.

In addition, in the present technology, the information processing unit may control the detecting unit to finish the detection for the one container.

The microparticle measuring device according to the present technology is further provided with a liquid sending unit which sends the microparticles from the plurality of containers, in which the information processing unit may control the liquid sending unit to finish liquid sending from the one container for controlling to finish the detection for the one container.

Furthermore, the microparticle measuring device according to the present technology is further provided with a liquid sending unit which sends the microparticles from the plurality of containers, in which the information processing unit may control the liquid sending unit to start liquid sending from another container out of the plurality of containers after controlling to finish the detection for the one container.

Moreover, in the present technology, the information processing unit may control to display that the detection is finished due to the abnormality based on the mixture of the bubble for the one container.

Furthermore, the present technology also provides a microparticle measuring method provided with a detecting step of detecting light from a microparticle sent from one of a plurality of containers containing microparticles, and an information processing step of controlling to specify a feature amount related to a detection number in a certain time section on the basis of information detected at the detecting step, determine that the feature amount is abnormal on the basis of a predetermined threshold, and finish detection for the one container.

In the present technology, "microparticles" broadly include bio-related microparticles such as cells, microorganisms, and liposomes, synthetic particles such as latex particles, gel particles, and industrial particles, or the like.

The bio-related microparticles include chromosomes forming various cells, liposomes, mitochondria, organelles (cell organelles) and the like. The cells include animal cells (for example, hemocyte cells and the like) and plant cells. The microorganisms include bacteria such as *Escherichia coli*, viruses such as tobacco mosaic virus, fungi such as yeast and the like. Moreover, the bio-related microparticles also include bio-related polymers such as nucleic acids, proteins, and complexes thereof. Furthermore, the industrial particles may be, for example, an organic or inorganic polymer material, metal or the like. The organic polymer material includes polystyrene, styrene/divinylbenzene, polymethyl methacrylate and the like. The inorganic polymer material includes glass, silica, a magnetic material and the like. The metal includes gold colloid, aluminum and the like. In general, shapes of the microparticles are generally spherical, but in the present technology, they may be non-spherical, and its size, mass and the like are also not especially limited.

Effects of the Invention

According to the present technology, it is possible to improve measurement efficiency in microparticle measurement for optically measuring a characteristic of microparticles. Note that, the effects herein described are not necessarily limited and may be any of the effects described in the present disclosure.

MODE FOR CARRYING OUT THE INVENTION

Hereinafter, a preferred mode for carrying out the present technology is described with reference to the drawings. The embodiment hereinafter described illustrates an example of a representative embodiment of the present technology, and the scope of the present technology is not narrowed by them. Note that, the description is given in the following order.

1. Microparticle Measuring Device 1
  (1) Detecting Unit 11
  (2) Information Processing Unit 12
  [Information Processing Example 1]
  <Specific Example of Event Check>
  [Information Processing Example 2]
  <Return Flow>
  <Bubble Data Mask>
  <Specific Example of Event Check (Bubble Detection)>
  <Example of Result in Case Where Event Check and Return Flow Is Performed>
  <Specific Example of Bubble Data Mask>
  <Example of Result in Case Where Bubble Data Mask is Performed>
  (3) Liquid Sending Unit 13
  (4) Light Applying Unit 14
  (5) Sorting Unit 15
  (6) Storage Unit 16
  (7) Flow Path P
  (8) Display Unit 17
  (9) User Interface 18
  (10) Others
2. Microparticle Measuring Method <1. Microparticle Measuring Device 1>

Figure 1:
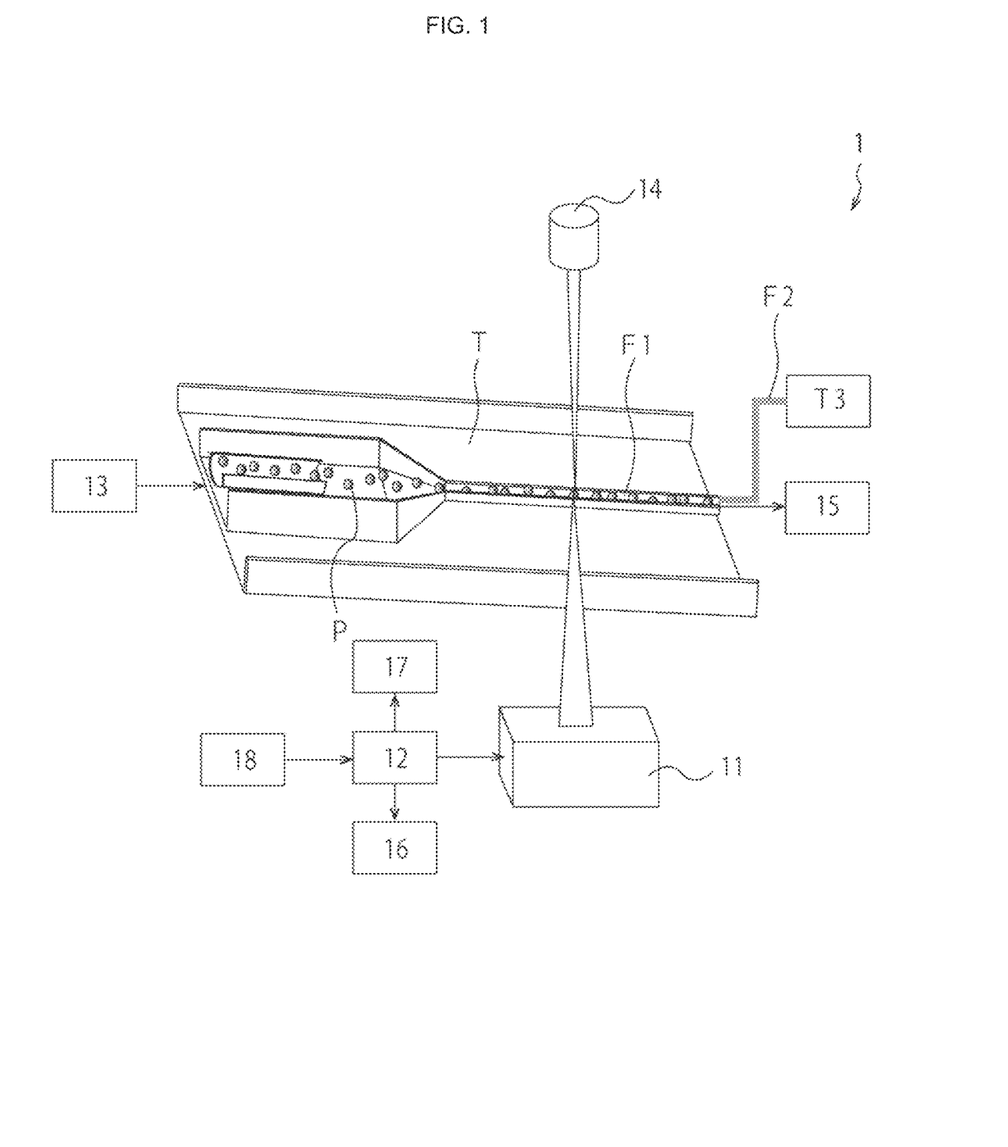
FIG. 1 is a schematic conceptual diagram schematically illustrating a first embodiment of a microparticle measuring device 1 according to the present technology.
Figure 2:
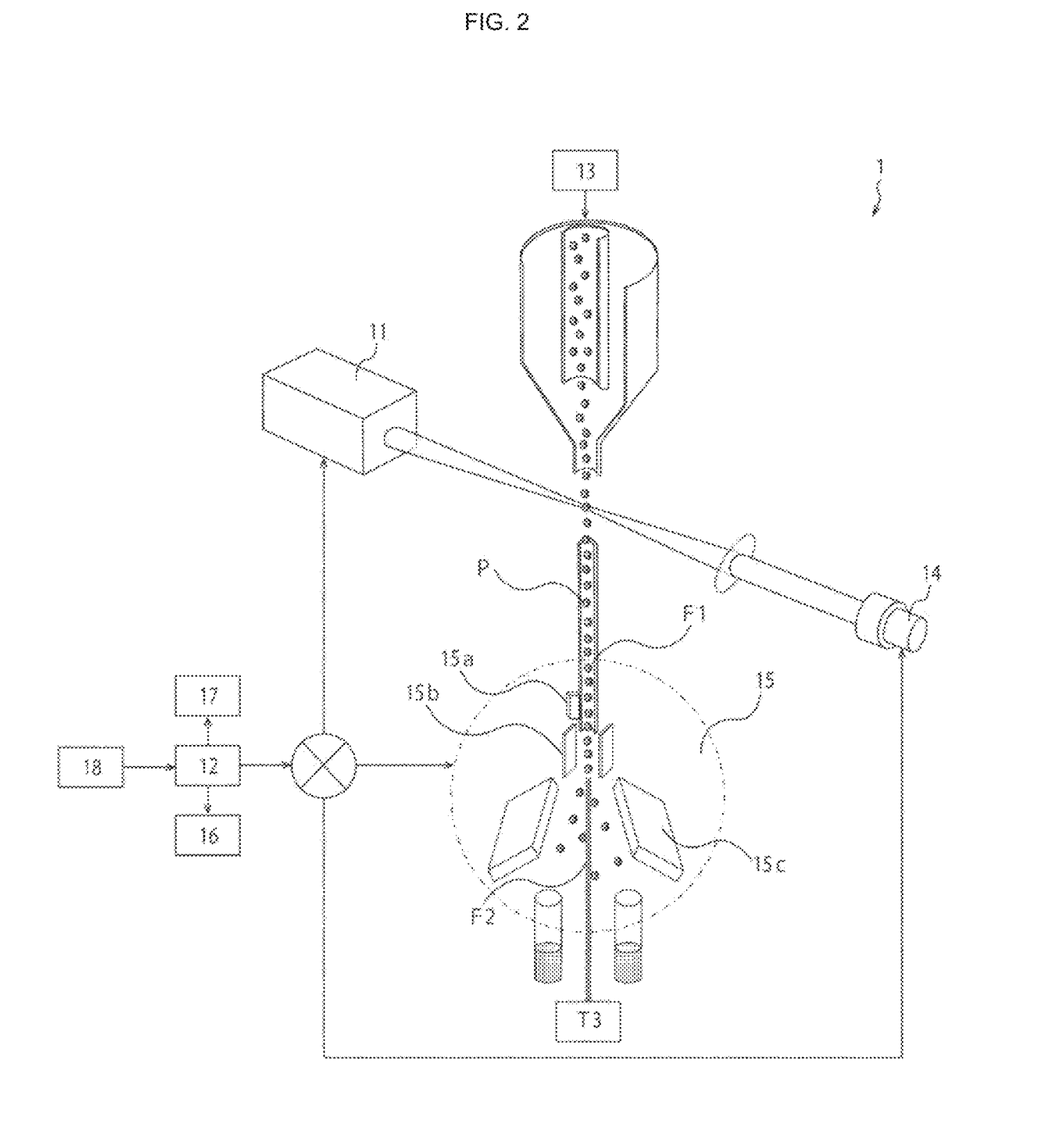
FIG. 2 is a schematic conceptual diagram schematically illustrating a second embodiment of the microparticle measuring device 1 according to the present technology.

FIG. 1 is a schematic conceptual diagram schematically illustrating a first embodiment of a microparticle measuring device 1 according to the present technology, and FIG. 2 is a schematic conceptual diagram schematically illustrating a second embodiment of the microparticle measuring device 1 according to the present technology. The microparticle measuring device 1 according to the present technology is a device which optically measures a characteristic of a microparticle and is at least provided with a detecting unit 11 and an information processing unit 12. Furthermore, this may also be provided with a liquid sending unit 13, a light applying unit 14, a sorting unit 15, a storage unit 16, a flow path P, a display unit 17, a user interface 18 and the like as needed. Hereinafter, each unit is described in detail.

(1) Detecting Unit 11

The detecting unit 11 detects light from the microparticle sent from one of a plurality of containers containing the microparticles.

A type of the detecting unit 11 is not especially limited as long as this may detect the light from the microparticle, and a well-known light detector may be appropriately selected. For example, one or two or more types out of a fluorescence measuring instrument, a scattered light measuring instrument, a transmitted light measuring instrument, a reflected light measuring instrument, a diffracted light measuring instrument, an ultraviolet spectrometer, an infrared spectrometer, a Raman spectrometer, a FRET measuring instrument, a FISH measuring instrument, various other spectrum measuring instruments, a so-called multichannel light detector obtained by arranging a plurality of light detectors in array and the like may be freely combined to be adopted.

In the present technology, an area imaging element such as a CCD and a CMOS element, a PMT, a photodiode and the like may be provided as the detecting unit 11, but among them, it is especially preferable to provide the PMT as the detecting unit 11.

Furthermore, in the present technology, it is preferable that a plurality of light receiving elements having different detection wavelength ranges forms the detecting unit 11. By forming the detecting unit 11 of a plurality of light receiving elements having different detection wavelength ranges, it is possible to measure intensity of light in a continuous wavelength range as a fluorescence spectrum. Specifically, for example, this may be a plurality of independent detection channels arranged such as a PMT array or a photodiode array in which light receiving elements are arrayed in one dimension, or a two-dimensional light receiving element such as a CCD or a CMOS; however, among them, it is especially preferable to form the detecting unit 11 of a plurality of PMTs.

An installation position of the detecting unit 11 in the microparticle measuring device 1 is not especially limited as long as the light from the microparticle may be detected, and this may be freely designed as appropriate. For example, as illustrated in FIGS. 1 and 2, this is preferably arranged on a side opposite to the light applying unit 14 across the flow path P. Furthermore, since fluorescence is also emitted in a direction different from an incident direction of the irradiation light, in the present technology, the detecting unit 11 may also be installed on the same side as the light applying unit 14 or on a side at about 90° with reference to the flow path P.

(2) Information Processing Unit 12

The information processing unit 12 performs various types of information processing and various analyses, and controls the detecting unit 11, the liquid sending unit 13, the light applying unit 14, the sorting unit 15, the storage unit 16, the display unit 17, the user interface 18 and the like. As the information processing, this specifically specifies a feature amount related to a detection number in a certain time section on the basis of information detected by the detecting unit 11, determines that the feature amount is abnormal on the basis of a predetermined threshold, and controls to finish detection for the one container. Note that, in this specification, a series of flow of information processing is sometimes referred to as "event check".

As described above, in a conventional device (especially, a device in which measurement is fully automated), it is often the case that sample solution is put into a plurality of containers and measurement is continuously performed; in this case, it is sometimes set such that the measurement in the container is finished at a time point at which the detection number from one container reaches a certain number. However, when the detection number is set as a condition of finishing the measurement of each container, the measurement in the container is not finished until the detection number reaches a certain number.

A phenomenon that the measurement in the container is not finished may occur because of a mistake in operation, an error caused by the device and the like: such as in a case where there is only buffer solution but no sample in the container (specifically, for example, the sample is not put erroneously and the like), sample concentration is extremely low, the sample is of a small amount, a sample line is clogged, the sample runs out in the middle, the sample solution does not enter a flow cell, and the sample is precipitated. When the device cannot recognize such various behaviors, there is a case where unnecessary measurement data is obtained and measurement takes time. Furthermore, when the measurement is interrupted in the same container, the samples in other containers are deteriorated with time and there is an adverse effect in entire measurement data sometimes. For this, it is conceivable to set timeout in the measurement of a certain container, but the setting is not always necessarily appropriate, which adversely affects the measurement data on the contrary.

Furthermore, as described above, in a case where there is no sample in the container, air is sucked to be a bubble in the flow path, so that there is an adverse effect that the measurement data of the samples thereafter significantly varies. Therefore, it is conceivable to mount a special sensor such as a bubble sensor to detect the bubble, but it may be sometimes difficult to mount due to its structure, and its design and parts cost. Furthermore, in order to remove the bubble, it is conceivable to wash for a long time after each sample measurement is finished, but in that case, the measurement time becomes long.

On the other hand, in the present technology, it is possible to improve measurement efficiency by performing the above-described information processing (event check). As a result, following effects may be obtained: (i) the measurement is finished without staying in the same container for a long time even if there is the mistake in operation, the error caused by the device or the like, and the measurement time is not wasted, (ii) in the fully automated measurement, only useful data may be efficiently obtained, (iii) highly reliable and rapid measurement becomes possible in the fully automated measurement, (iv) mount of a hardware bubble sensor and development thereof are unnecessary, (v) data caused by the bubble and poor data around the same are excluded and only excellent data may be used for analysis and the like.

As a method of the event check, free methods may be used as appropriate according to a type of the detecting unit 11, a type of the microparticle to be measured, a purpose of measurement and the like. Specifically, for example, there may be methods described in following information processing examples 1 and 2 and the like.

Information Processing Example 1

Figure 3A:
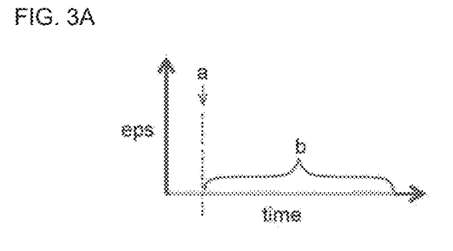
FIG. 3A is a view illustrating an eps-time curve in a case where an event is not detected from the beginning (case 1)
Figure 3B:
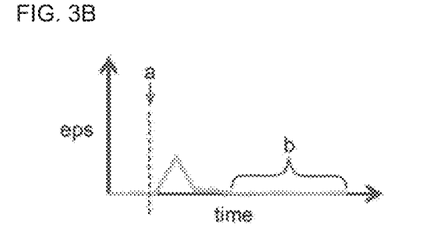
FIG. 3B is a view illustrating an eps-time curve in a case where the event is not detected after a boost (case 2)
Figure 3C:
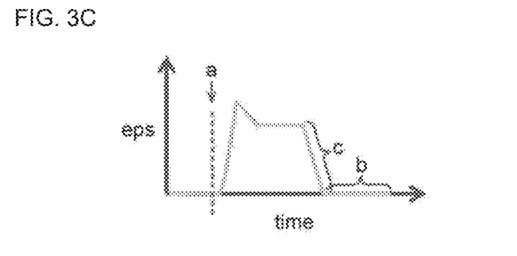
FIG. 3C is a view illustrating an eps-time curve in a case where the sample runs out in the middle and the event is not detected (case 3).

The information processing example 1 is a processing example supposing a case where no event is detected from the beginning as illustrated in FIG. 3A (case 1), a case where no event is detected after a boost as illustrated in FIG. 3B (case 2), and a case where the sample runs out in the middle and the event is not detected as illustrated in FIG. 3C (case 3). In FIGS. 3A, 3B, and 3C, a indicates a measurement start time point, b indicates a time point at which the event is not detected, and c indicates a time point at which the events decrease.

As for the cases 1 and 2, for example, the feature amount is the detection number per unit time, and in a case where the detection number per unit time is smaller than the predetermined threshold, this is determined to be abnormal.

More specifically, for example, the detection number per second: eps is evaluated from after a lapse of a certain time after the boost ends, and if the detection number is smaller than a predetermined threshold, this is determined to be abnormal. Note that, a factor which causes the cases 1 and 2 may be, for example, that there is no sample, suction power of the device itself is weak, the sample concentration is low, the sample is precipitated, and the sample is highly viscous and is not sucked. For the factors that the sample is precipitated, the sample is highly viscous and is not sucked, for example, a process such as stirring and reading again after increasing suction pressure may be performed after the measurement is finished as one of operation candidates.

As for the case 3, for example, as is the case with the cases 1 and 2, the feature amount is the detection number per unit time, and in a case where the detection number per unit time is smaller than the predetermined threshold, this is determined to be abnormal. In this case, it is conceivable that the predetermined threshold is set to a value specified on the basis of the detection number per unit time after a lapse of a predetermined time from the start of detection.

More specifically, for example, eps after a lapse of a certain time from the start of the measurement is set as a reference number, and if the detection number per unit time thereafter is smaller than a certain ratio of the reference number, this is determined to be abnormal. Furthermore, in the present technology, in the case 3, as in the cases 1 and 2, the detection number per unit time is also continuously evaluated with the absolute number described above, and possibility of abnormality determination by this may also be continued.

Note that, in the present technology, the information processing unit 12 may control to display a warning in a case where this determines abnormality. Furthermore, in a case where the information processing unit 12 determines abnormality a predetermined number of times, this may control to finish the detection for the one container. In the present technology, it is preferable that the predetermined number of times is a plurality of times.

Moreover, the information processing unit 12 may also control to display that the detection is finished on the basis of the abnormality for the one container (for example, display "error"). More specifically, this may be performed by controlling the display unit 17 to be described later. Furthermore, the information processing unit 12 may also control the detecting unit 11 to finish the detection for the one container. Of course, the same applies to a case of the information processing example 2 (case 4) to be described later.

Next, the boost is described. The boost is performed to make occurrence of an initial event as early as possible. However, if the boost is strong, in the detection during the boost, variation in passing position of the sample becomes large and the data is often deteriorated. Therefore, in a case of a small amount of sample or a sample susceptible to shock, the boost might be shortened, and in a case of a large amount of sample or a sample not susceptible to shock, the boost might be made strong.

Figure 4:
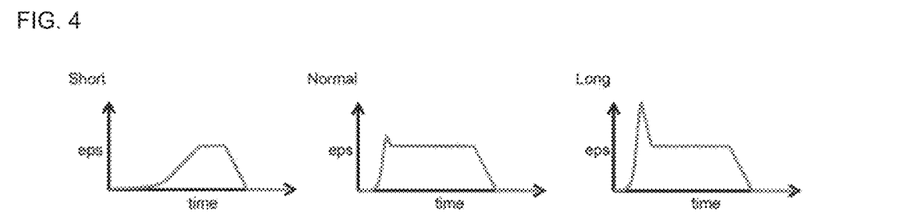
FIG. 4 is a view illustrating a relationship between three types of strength (short, normal, and long) of the boost and an initial eps-time curve.

Depending on the strength of the boost (for example, three types of short, normal, and long), an initial eps-time curve changes as illustrated in FIG. 4. Therefore, it is necessary to change a start time point of the event check depending on the strength of the boost. For example, in each boost, a wait time is set to 12 seconds for short and seven seconds for normal and long, and the start time point of the event check is set after the wait time elapses.

Hereinafter, the information processing example 1 is described in more detail using a concrete example of measurement data.

<Specific Example of Event Check>

Figure 5:
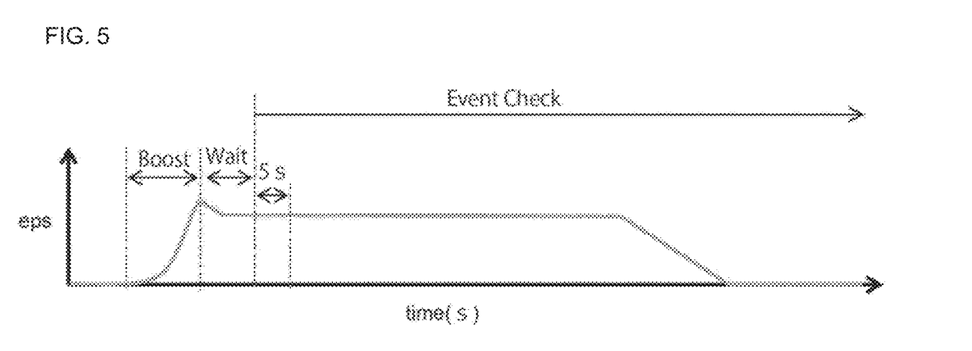
FIG. 5 is a graph substituted for drawing illustrating an example of measurement data (eps-time curve) in the microparticle measuring device 1.

FIG. 5 is a graph substituted for drawing illustrating an example of the measurement data (eps-time curve) in the microparticle measuring device 1. The wait time is set according to the type of the boost, and the event check is started after the wait time elapses; for example, maximum eps in five seconds is set as a reference number. Furthermore, a determination standard of an absolute detection number (=predetermined threshold in a case of the cases 1 and 2) is made smaller than five. Moreover, 10% of the reference number is set as a determination standard of a decrease in events (=predetermined threshold in a case of the case 3). Since the sample concentration is different and the occurrence of the event also differs for each container, the reference number is obtained every time.

Evaluation of eps is carried out every second, and in a case where this is lower than the above-described determination standards, this is determined to be abnormal and "warning 1" is set. In order to avoid malfunction of small eps due to sample bias and the like, in a case where this warning occurs five consecutive times, it is determined that there is the error, the measurement in this container is finished, and the measurement of the next container is started.

The method described in this specific example may cope with any of the cases 1 to 3 described above.

Information Processing Example 2

Figure 6:
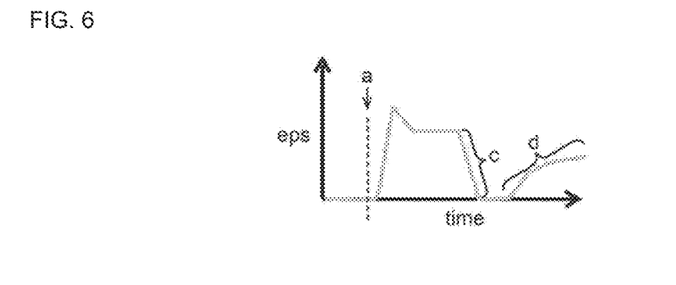
FIG. 6 is a view illustrating an eps-time curve in a case where the sample runs out in the middle and a bubble is detected as an event (case 4).

The information processing example 2 is a processing example in which a case in which the sample runs out in the middle and the bubble is detected as the event as illustrated in FIG. 6 (case 4). In FIG. 6, a indicates a measurement start time point, c indicates a time point at which the events decrease, and d indicates a time point at which the bubble is detected as the event.

The bubble has a forward scattering signal and is detected as the event as in the case of the normal sample. Therefore, it is not possible to distinguish the normal sample from the bubble by the scattering signal.

Here, since a measurable sample size of a device such as a flow cytometer is often several tens of μm at the maximum, it is possible to logically calculate a maximum value of a trigger time detected in sample scattered light (=a time in which the detected signal is triggered, a sample detection time) by this, a diameter in a focal point of a laser, and a rate of liquid flowing through the flow path.

Figure 7:
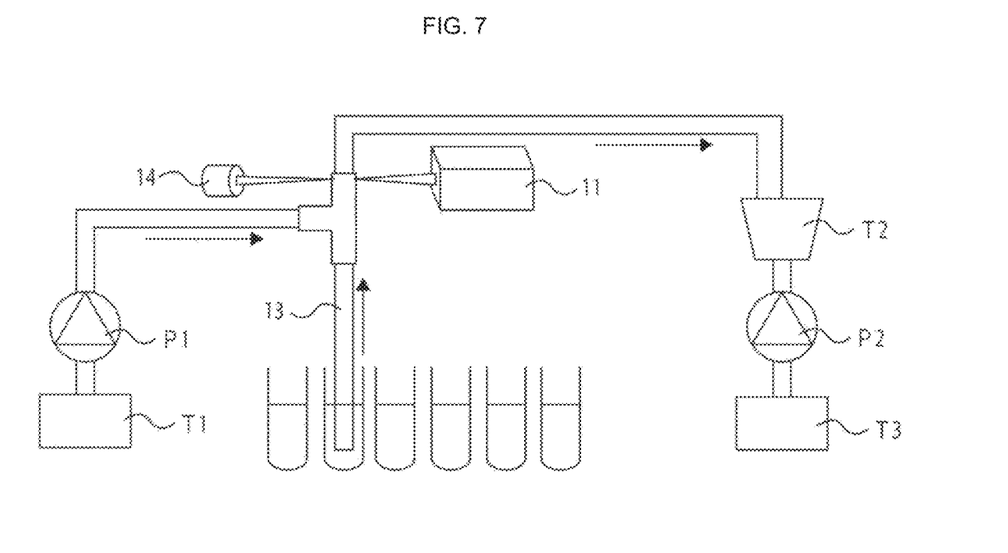
FIG. 7 is a view schematically illustrating a portion relating to a structure for taking the sample under a negative pressure in the microparticle measuring device 1.

Some bubbles are small and some are large, and the trigger time by bubble detection depends on a size of the bubble. In a case where the bubble is larger than the maximum measurable sample size of the device, it is possible to distinguish by the trigger time. Especially, in a structure in which the sample is taken in under a negative pressure as illustrated in FIG. 7, when the sample runs out, air is sucked and bubbles always pass through the detecting unit 11, so that a feature appears in the trigger time in the event. Note that an arrow in FIG. 7 indicates a liquid sending direction.

Therefore, as a method of detecting the bubble, for example, a method is considered in which a ratio (R) per unit time of a waveform pulse in which the trigger time is detected above a predetermined threshold time (Tth) by the detecting unit is set as the feature amount, and in a case where R excesses the predetermined threshold, the above-described abnormality is determined to be the abnormality based on mixture of the bubble. As a method of setting Tth, for example, in a case where there is an upper limit of the size of the microparticle to be measured due to a specification of the device, there is a method of setting on the basis of the trigger time corresponding to the upper limit and the like.

Furthermore, in this case, the predetermined threshold may be set to a value determined in advance (Rth) on the basis of the size of the microparticle to be measured. As a method of setting Rth, for example, in a case where there is the upper limit of the size of the microparticle to be measured due to the specification of the device, there is a method of setting while taking a ratio of the events exceeding Tth set by the above-described method and the like into consideration, for example.

Then, in a case where R exceeds Rth, it is determined that the bubble is included, and this is determined to be abnormal. Thereafter, in the present technology, the information processing unit 12 may enter an operation corresponding to a return flow and a bubble data mask to be described later.

Note that, in the present technology, the information processing unit 12 may also control to display that the detection is finished due to the abnormality based on the mixture of the bubble for the one container. For example, the information processing unit 12 may control to distinguish the display between the case of the cases 1 to 3 and the case of the case 4 described above, and display to notify a user whether or not the abnormality is the abnormality based on the mixture of the bubble.

<Return Flow>

In a case where the air is sucked by a sample nozzle, the bubble in a drainage flow path leads to disturbance in liquid sending. In order to return to the liquid sending without disturbance, it is necessary to remove the bubble from the drainage flow path. As a specific method of removing the bubble, for example, there may be, in a case where the microparticle measuring device 1 according to the present technology further includes a detection flow path F1 through which the microparticle flows to be detected and a drainage flow path F2 connecting the detection flow path F1 and a drainage container T3, a method in which the information processing unit 12 controls to drain the bubble from the detection flow path F1 and/or the drainage flow path F2 (preferably, from the detection flow path F1 and the drainage flow path F2) to the drainage container T3. This makes it possible to eliminate the disturbance of the liquid sending due to the mixture of the bubble. Note that, in this specification, this series of flow is referred to as a "return flow".

<Bubble Data Mask>

Since a load of the sample is light in not only the data when the bubble is detected but also the data immediately before the same, a flow point is disturbed and the measurement data has large variation. As a specific method of suppressing this variation, for example, there may be a method of analyzing the microparticle while eliminating information detected when the bubble is detected and up to a time point a predetermined time before the bubble detection start time point out of the information detected by the detecting unit 11. With this arrangement, it is possible to analyze only excellent data as test data. Note that, in this specification, this series of flow is referred to as "bubble data mask".

Hereinafter, the information processing example 2 is described in more detail using a concrete example of the measurement data.

<Specific Example of Event Check (Bubble Detection)>

Figure 8:
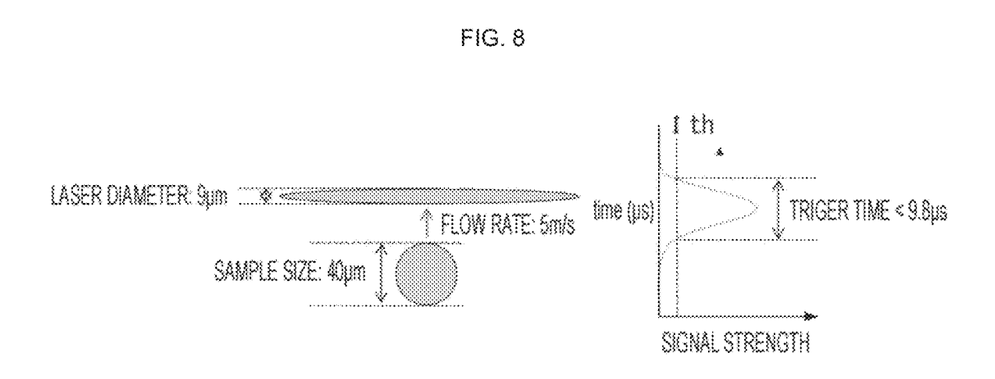
FIG. 8 is a view illustrating a relationship among a laser diameter, a flow rate, a sample size, and a trigger threshold (Ith) in describing a specific example of trigger time calculation.

For example, in the microparticle measuring device 1 in which the upper limit in specification of the measurable sample size is 40 μm, as illustrated in FIG. 8, the laser diameter is 9 μm in a flow path direction and a flow rate is 5 m/s, so that the trigger time when the sample the size of which is 40 μm is detected is $(40+9)*(10^{-6})/5=9.8$ (μs) in a case where rising and trailing of the signal are captured by a threshold (Ith) of the trigger for signal strength (however, since Ith is set slightly higher in a normal case, the trigger time is practically shorter than 9.8 μs).

For example, the threshold (Tth) for discriminating the trigger time is set to 12 μs, taking variation in the liquid sending rate into consideration and the like. Furthermore, since it is found that a ratio of the sample with which the trigger time is longer than 12 µs when there is no sample and the bubble is sucked is 15% or larger in this device, the threshold of the ratio of the events exceeding Tth (Rth) is set to 10%.

From the description above, as a system, in a case where the ratio of the events exceeding Tth (=12 µs) in the eps exceeds Rth (=10%), it is determined that the bubble enters and this is determined to be abnormal, so that "warning 1" is set. In a case where this warning occurs five consecutive times, it is determined that the error occurs and the measurement in the container is finished. Thereafter, the return flow described above is carried out and the measurement is started in the next container.

<Example of Result In Case Where Event Check and Return Flow Is Performed>

Figure 9A:
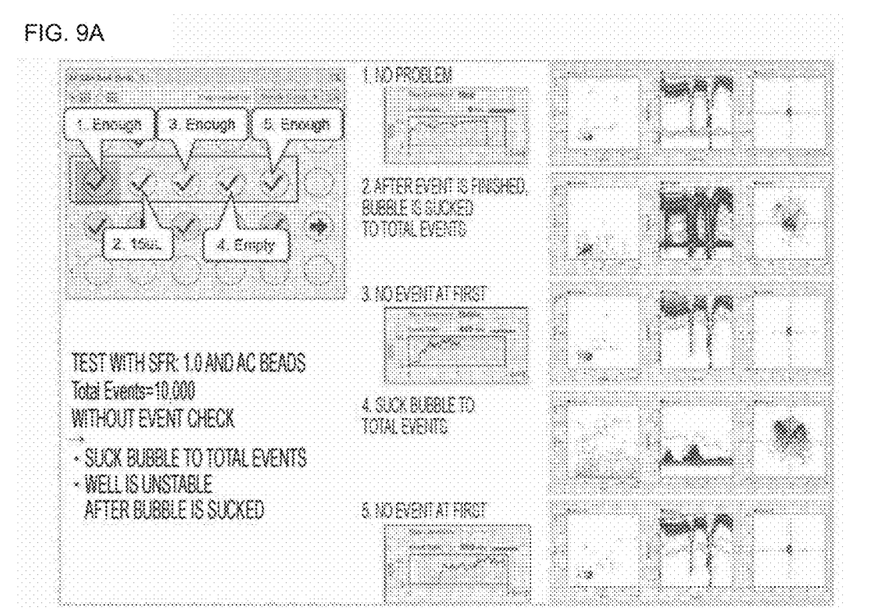
FIG. 9A is a view illustrating a result in a case where an event check and a return flow are not performed.
Figure 9B:
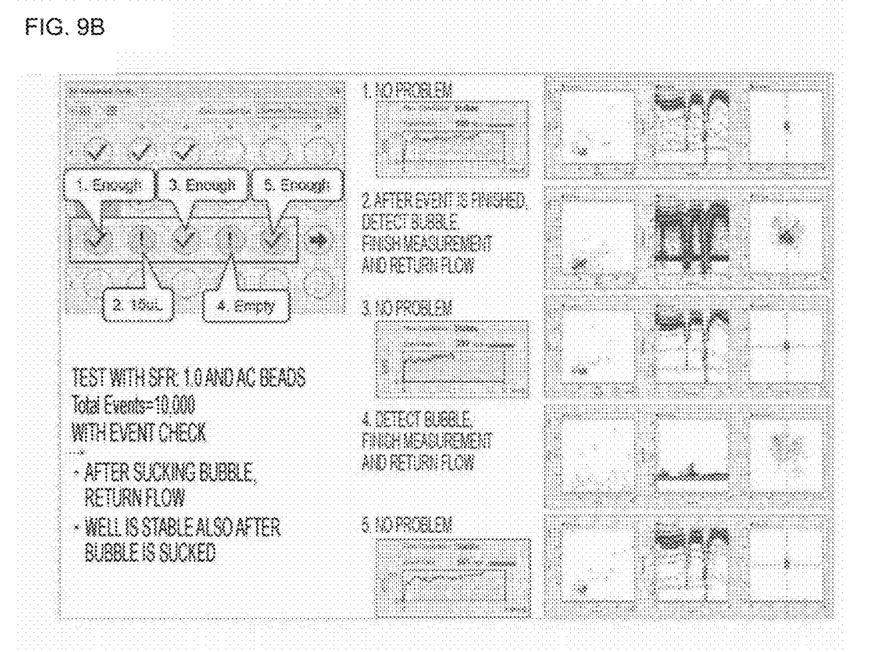
FIG. 9B is a view illustrating a result in a case where the event check and return flow are performed.

FIG. 9A is a view illustrating a result in a case where the event check and return flow are not performed, and FIG. 9B is a view illustrating a result in a case where the event check and return flow are performed. In FIG. 9A, since the bubble detection (event check) is not performed, the bubbles are sucked up to total events (=10,000), and the measurement data of the next container (well) after the bubbles are sucked is unstable. On the other hand, in FIG. 9B, the bubble detection is performed and the measurement in the container is finished, then the return flow is performed. Therefore, it is understood that the measurement data in the next container is stable even after sucking the bubble.

<Specific Example of Bubble Data Mask>

Figure 10:
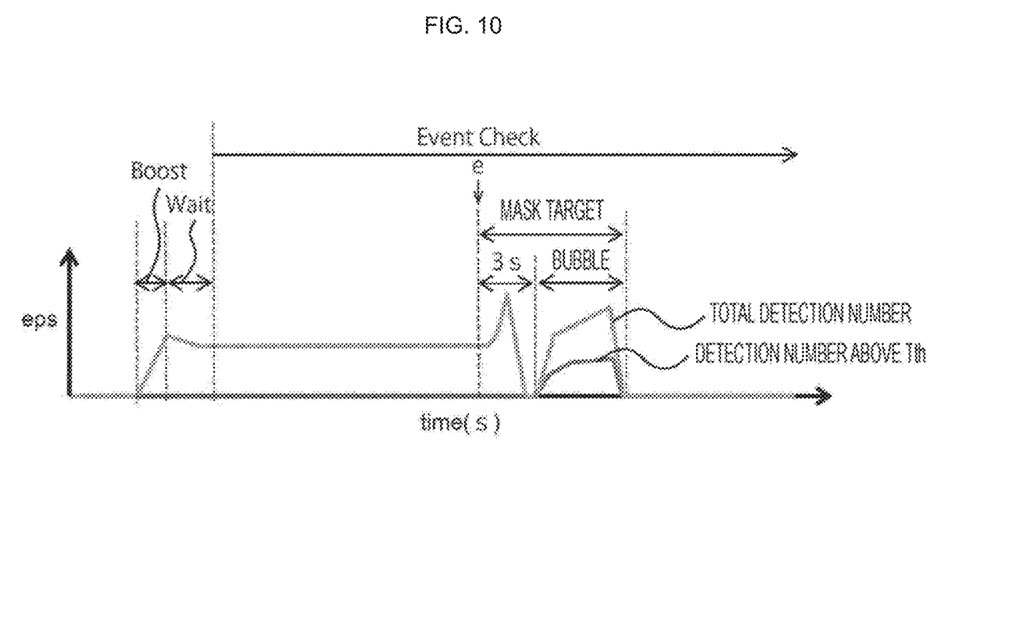
FIG. 10 is a graph substituted for drawing illustrating an example of the measurement data (eps-time curve) in the microparticle measuring device 1 different from FIG. 5.

FIG. 10 is a graph substituted for drawing illustrating an example of the measurement data (eps-time curve) in the microparticle measuring device 1 different from FIG. 5. Since the bubble may be generated at the time of the boost, before the bubble detection is started, the wait time is set to seven seconds, for example, after the boost is finished. When the sample runs out, the air enters and the load becomes lighter, so that the detection number increases, a core flow variation becomes larger, and the data is deteriorated (refer to the data after a time point e in FIG. 10). Therefore, it is necessary to perform the bubble data mask. Specifically, for example, as illustrated in FIG. 10, a part of the bubble data and a section three seconds before the time at which the bubble starts entering are set as a mask target. In this case, in the obtained data, a ratio of the bubble is verified every 0.1 second according to the detection number from the end, and the first bubble data time point is found. Next, from three seconds before then, a function of masking the data is applied, and only excellent data is used for analysis.

An algorithm of this bubble data mask is summarized as follows.

(a) Determine Rth in the last one second.

(b) In a case where Rth exceeds the determination standard, a determination section reaches back by 0.1 second and determination is performed.

(c) Repeatedly perform (b) until time at which Rth does not exceed the determination standard.

(d) Return by three seconds from the time at which Rth does not exceed the determination standard, and a bubble data mask target section is set from there to the end.

<Example of Result in Case Where Bubble Data Mask is Performed>

Figure 11A:
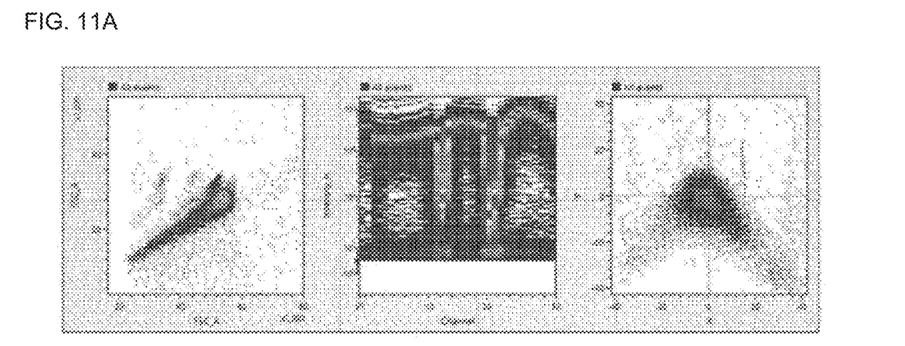
FIG. 11A is a view illustrating a result in a case where bubble data mask is not performed.
Figure 11B:
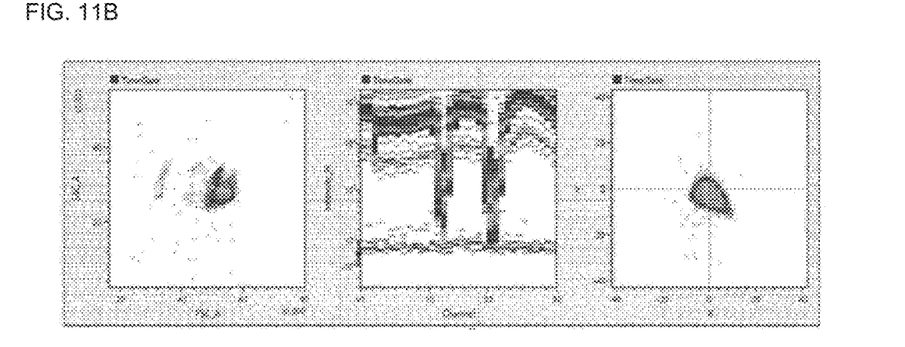
FIG. 11B illustrates a result in a case where the bubble data mask is performed.

FIG. 11A is a view illustrating a result in a case where the bubble data mask is not performed, and FIG. 11B illustrates a result in a case where the bubble data mask is performed. In FIG. 11A, the variation in bubble and core is large, and the variation of data is large as a whole. On the other hand, in FIG. 11B, it is understood that the variation of the data is smaller than that of A.

(3) Liquid Sending Unit 13

The microparticle measuring device 1 according to the present technology may further be provided with the liquid sending unit 13. The liquid sending unit 13 sends the microparticles from the plurality of containers. More specifically, for example, the sample is sent from the container containing the sample (test tube, microtube, well and the like) through a nozzle, or the sample is sent by applying a pressure to a storage unit capable of storing the container containing the sample.

In a case where the microparticle measuring device 1 according to the present technology is provided with the liquid sending unit 13, the information processing unit 12 described above controls to finish the detection for the one container, so that this may control the liquid sending unit 13 to finish sending the liquid from the one container. Furthermore, the information processing unit 13 may control the liquid sending unit 13 so as to start sending the liquid from another container out of the plurality of containers after controlling to finish the detection for the one container. With this arrangement, it is possible to further improve efficiency of the measurement.

(4) Light Applying Unit 14

The microparticle measuring device 1 according to the present technology may further be provided with the light applying unit 14. The light applying unit 14 applies light to the microparticle to be analyzed.

A type of the light applied from the light applying unit 14 is not especially limited, but in order to surely generate the fluorescence or scattered light from the particle, light having constant light direction, wavelength, and light intensity is preferable. Specifically, there may be, for example, a laser, an LED and the like. In a case of using the laser, a type thereof is not especially limited also, but it is possible to use an argon ion (Ar) laser, a helium-neon (He—Ne) laser, a dye laser, a krypton (Cr) laser, a semiconductor laser, a solid laser obtaining by combining the semiconductor laser and a wavelength conversion optical element or the like by freely combining one or two or more types of them.

(5) Sorting Unit 15

The microparticle measuring device 1 according to the present technology may further be provided with the sorting unit 15 which sorts the microparticles. The sorting unit 15 sorts the microparticles on the basis of spectrum data generated by correcting the value detected by the detecting unit 11 by the information processing unit 12. The sorting unit 15 may sort the microparticles downstream of the flow path P on the basis of an analysis result such as the size, form, and internal structure of the microparticle analyzed from the spectrum data.

Specifically, for example, as illustrated in FIG. 2, vibration is applied to an entire flow path P or a part thereof by using a vibration element 15a and the like which vibrates at a predetermined vibration frequency, thereby generating a droplet from a discharge port of the flow path P. Note that, in this case, the vibration element 15a to be used is not especially limited, and any well-known vibration element may be freely selected as appropriate. As an example, there may be a piezo vibration element and the like. Furthermore, it is possible to adjust a size of the droplet and generate the droplet containing a certain amount of microparticles by adjusting a liquid sending amount to the flow path P, a diameter of the discharge port, the vibration frequency of the vibration element and the like.

Next, the droplet is charged with positive or negative charge on the basis of the analysis result such as the size, form, and internal structure of the microparticle analyzed on the basis of spectrum data corrected to be generated by the information processing unit 12 (refer to a reference sign 15*b* in FIG. 2). Then, a pathway of the charged droplet is changed in a desired direction by an opposite electrode 15*c* to which voltage is applied and is sorted.

(6) Storage Unit 16

The microparticle measuring device 1 according to the present technology may further be provided with the storage unit 16. The storage unit 16 may store all items regarding the measurement such as the feature amount, the predetermined threshold, a determination result by the information processing unit 12, the value detected by the detecting unit 11, the spectrum data generated by the information processing unit 12, a reference spectrum of each channel, and the analysis result.

In the microparticle measuring device 1, the storage unit 16 is not indispensable, and an external storage device may be connected. As the storage unit 16, for example, a hard disk or the like may be used.

(7) Flow Path P

The microparticle measuring device 1 according to the present technology may further be provided with the flow path P. In the microparticle measuring device 1 according to the present technology, it is possible to analyze and sort the microparticles by detecting optical information obtained from the microparticles arranged in a line in the flow cell (flow path P).

Although the flow path P may be provided in advance in the microparticle measuring device 1, it is also possible that a commercially available flow path P, a disposable chip provided with the flow path P or the like is installed in the microparticle measuring device 1 to analyze or sort.

The form of the flow path P is also not especially limited, and may be freely designed. For example, this is not limited to the flow path P formed in a two-dimensional or three-dimensional plastic or glass substrate T as illustrated in FIG. 1, and as illustrated in FIG. 2, the flow path P used in a conventional flow cytometer may also be applied to the microparticle measuring device 1 according to the present technology.

Furthermore, a flow path width, a flow path depth, and a flow path cross-sectional shape of the flow path P are also not especially limited as long as the flow path has a form capable of forming a layer flow, and may be freely designed. For example, a micro flow path having a flow path width of 1 mm or smaller may also be used for the microparticle measuring device 1. Especially, the micro flow path having the flow path width of about 10 μm or larger and 1 mm or smaller is suitable as the microparticle measuring device 1 according to the present technology.

(8) Display Unit 17

The microparticle measuring device 1 according to the present technology may further be provided with the display unit 17. The display unit 17 may display all items regarding the measurement such as the feature amount, the predetermined threshold, the determination result by the information processing unit 12, the value detected by the detecting unit 11, the data generated by the information processing unit 12, the reference spectrum of each channel, and the analysis result.

Specifically, for example, the data and the like illustrated in FIGS. 9A, 9B, 11A and 11B are displayed. In the present technology, especially, as illustrated in an image on an upper left in FIG. 9B, in a case where the detection is finished on the basis of the abnormality for the one container (for example, in a case where the measurement at a certain well results in error and the like), a predetermined mark (for example, an exclamation mark or the like) may be displayed in a corresponding position of the container on the screen.

Furthermore, in a case where the detection is finished due to the abnormality based on the mixture of the bubble for the one container (=in a case where the detection is finished corresponding to case 4), a mark indicating that the abnormality is that based on the mixture of the bubble in a corresponding position of the container on the screen. In the present technology, moreover, a mark to be displayed may be changed appropriately according to the cases 1 to 4 corresponding to the cause by which the detection is finished to be displayed. This improves usability.

In the microparticle measuring device 1, the display unit 17 is not indispensable, and an external display device may also be connected. As the display unit 17, for example, a display, a printer and the like may be used.

(9) User Interface 18

The microparticle measuring device 1 according to the present technology may further be provided with the user interface 18 which is a part operated by the user. The user may access the information processing unit 12 through the user interface 18 and control each unit of the microparticle measuring device 1 according to the present technology.

In the microparticle measuring device 1, the user interface 18 is not indispensable, and an external operating device may also be connected. As the user interface 18, for example, a mouse, a keyboard and the like may be used.

(10) Others

Note that, in the present technology, it is possible to store a function performed in each unit of the microparticle measuring device 1 according to the present technology in a personal computer and a hardware resource provided with a control unit including a CPU and the like, a recording medium (nonvolatile memory (such as USB memory), HDD, CD and the like) and the like as a program, and allow the same to function by the personal computer or the control unit.

<2. Microparticle Measuring Method>

A microparticle measuring method according to the present technology is a method of at least performing a detecting step and an information processing step. Specific methods to be carried out at the detecting step and the information processing step are similar to the methods carried out by the detecting unit 11 and the information processing unit 12 of the microparticle measuring device 1 described above, so that the description thereof is omitted here.

Figure 12:
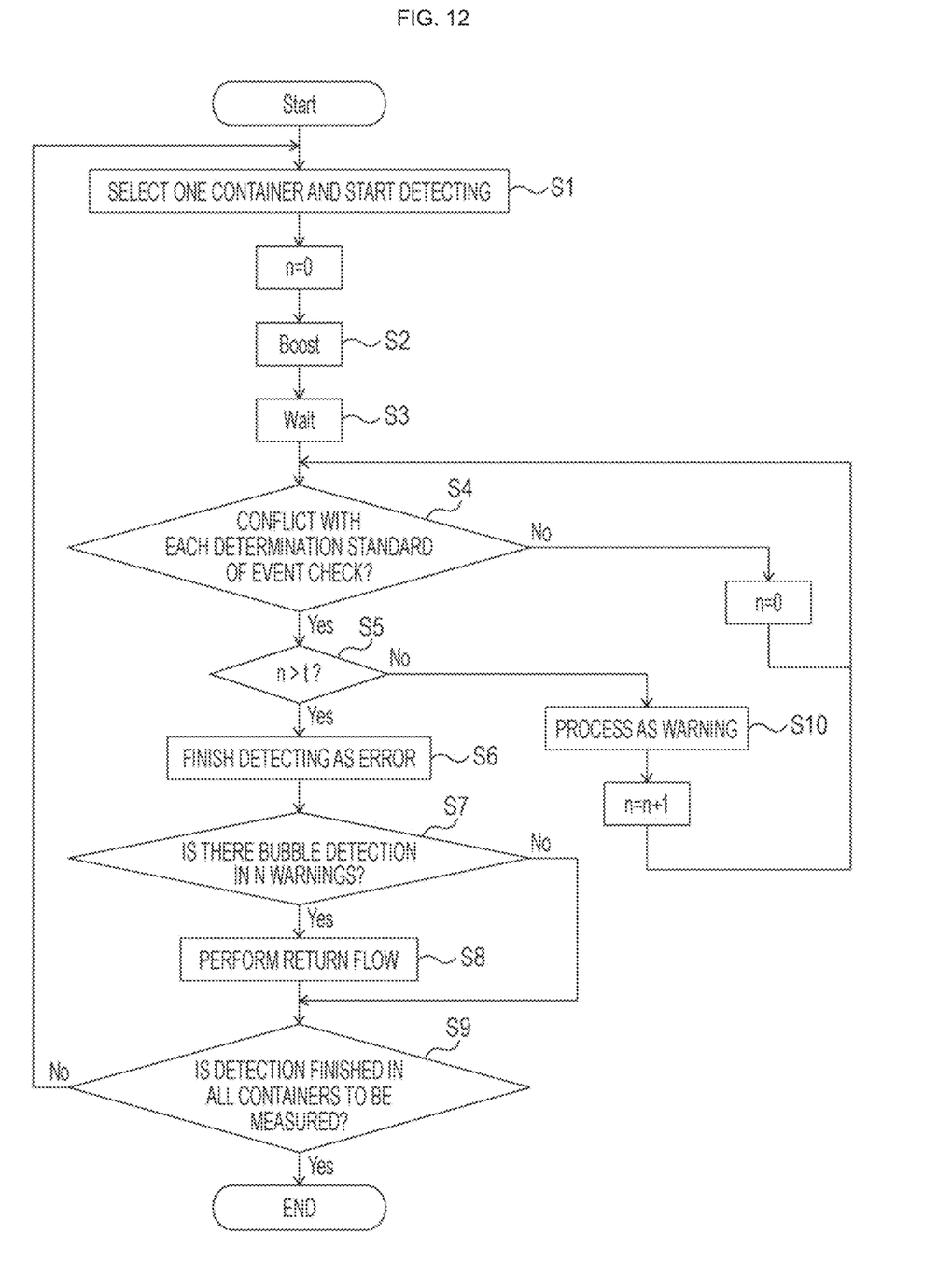
FIG. 12 is a flowchart illustrating an example of a flow of the microparticle measurement using a microparticle measuring method according to the present technology.

Hereinafter, an example of a flow of microparticle measurement using the microparticle measuring method according to the present technology is described with reference to FIG. 12. Note that a process at each step of the flowchart illustrated in FIG. 12 is performed, for example, by each of the above-described units.

First, the information processing unit 12 selects one container and starts detecting by the detecting unit 11 (step S1). Then, the information processing unit 12 sets n=0, performs the boost (step S2), and waits (step S3). As described above, the wait time may be arbitrarily set freely according to the type of the boost and the like.

Then, the information processing unit 12 determines whether or not it conflicts with each determination standard of the event check (step S4). Specifically, the determination standards include, for example, the determination standards described in the information processing examples 1 and 2 described above and the like. In a case where it does not conflict with each the determination standard, the information processing unit 12 sets n=0 and returns to step S4 again.

On the other hand, in a case of confliction with each determination standard, the information processing unit 12 determines whether or not n>t (for example, n>4) is satisfied (step S5). In a case where n>t is not satisfied, the information processing unit 12 processes the same as the warning, sets n=n+1, and returns to step S4 again. On the other hand, in a case where n>t is satisfied, the information processing unit 12 determines that this results in error and finishes detecting by the detecting unit 11 (step S6). Thereafter, the information processing unit 12 determines whether or not there is bubble detection in n warnings (step S7). In a case where the bubble is detected, the information processing unit 12 performs the return flow (step S8). Furthermore, although not illustrated in FIG. 12, at that time, the information processing unit 12 may also perform the bubble data mask.

In a case where there is no bubble detection or after the return flow is performed, the information processing unit 12 determines whether or not the detection in all the containers to be measured is finished (step S9). In a case where the detection in all the containers to be measured is not finished, the information processing unit 12 returns to step S1, selects next one container, and starts detecting again by the detecting unit 11. On the other hand, in a case where the detection in all the containers to be measured is finished, the information processing unit 12 finishes the measurement.

Note that the present technology may also take the following configuration.

(1)

A microparticle measuring device provided with:

a detecting unit which detects light from a microparticle sent from one of a plurality of containers containing microparticles; and an information processing unit which controls to specify a feature amount related to a detection number in a certain time section on the basis of information detected by the detecting unit, determine that the feature amount is abnormal on the basis of a predetermined threshold, and finish detection for the one container.

(2)

The microparticle measuring device according to (1), in which the information processing unit controls to display a warning in a case of determining abnormality.

(3)

The microparticle measuring device according to (1) or (2), in which, in a case where the information processing unit determines abnormality a predetermined number of times, the information processing unit controls to finish the detection for the one container.

(4)

The microparticle measuring device according to any one of (1) to (3), in which the feature amount is the detection number per unit time, and the information processing unit determines abnormality in a case where the detection number per unit time is smaller than the predetermined threshold.

(5)

The microparticle measuring device according to (4), in which the predetermined threshold is a value specified on the basis of the detection number per unit time after a lapse of a predetermined time from detection start.

(6)

The microparticle measuring device according to any one of (1) to (3), in which the information processing unit determines that the abnormality is abnormality based on mixture of a bubble.

(7)

The microparticle measuring device according to (6), in which the feature amount is a ratio (R) per unit time of a waveform pulse in which a trigger time is detected above a predetermined threshold time (Tth) by the detecting unit, and the information processing unit determines that the abnormality is based on the mixture of the bubble in a case where the ratio (R) exceeds the predetermined threshold.

(8)

The microparticle measuring device according to (7), in which the predetermined threshold is a value (Rth) determined in advance on the basis of a size of the microparticle to be measured.

(9)

The microparticle measuring device according to any one of (6) to (8), further provided with:

a detection flow path through which the microparticle flows to be detected; and a drainage flow path connecting the detection flow path and a drainage container, in which the information processing unit controls to drain the bubble from the detection flow path and/or the drainage flow path to the drainage container in a case where the abnormality is the abnormality based on the mixture of the bubble.

(10)

The microparticle measuring device according to any one of (6) to (9), in which, in a case where the abnormality is abnormality based on the mixture of the bubble, the information processing unit analyzes the microparticle while eliminating information detected at the time of bubble detection and up to a time point a predetermined time before a bubble detection start time point from information detected by the detecting unit.

(11)

The microparticle measuring device according to any one of (1) to (10), in which the information processing unit controls to display that the detection is finished on the basis of abnormality for the one container.

(12)

The microparticle measuring device according to any one of (1) to (11), in which the information processing unit controls the detecting unit to finish the detection for the one container.

(13)

The microparticle measuring device according to any one of (1) to (12), further provided with:

a liquid sending unit which sends the microparticles from the plurality of containers, in which the information processing unit controls the liquid sending unit to finish liquid sending from the one container for controlling to finish the detection for the one container.

(14)

The microparticle measuring device according to any one of (1) to (13), further provided with:

a liquid sending unit which sends the microparticles from the plurality of containers, in which the information processing unit controls the liquid sending unit to start liquid sending from another container out of the plurality of containers after controlling to finish the detection for the one container.

(15)

The microparticle measuring device according to any one of (6) to (14),
in which the information processing unit controls to display that the detection is finished due to the abnormality based on the mixture of the bubble for the one container.

(16)

A microparticle measuring method provided with:
a detecting step of detecting light from a microparticle sent from one of a plurality of containers containing microparticles; and
an information processing step of controlling to specify a feature amount related to a detection number in a certain time section on the basis of information detected at the detecting step, determine that the feature amount is abnormal on the basis of a predetermined threshold, and finish detection for the one container.

REFERENCE SIGNS LIST

1 Microparticle measuring device
11 Detecting unit
12 Information processing unit
13 Liquid sending unit
14 Light applying unit
15 Sorting unit
16 Storage unit
17 Display unit
18 User interface
P Flow path
T Substrate
T1 Sheath tank
T2 Internal drainage tank
T3 Drainage container
P1, P2 Pump
F1 Detection flow path
F2 Drainage flow path

The invention claimed is:

1. A microparticle measuring device, comprising:
a detector configured to detect light from a microparticle of a plurality of microparticles sent from a first container of a plurality of containers containing the plurality of microparticles; and
a central processing unit (CPU) configured to:
specify a feature amount related to a detection number in a determined time period, wherein the feature amount is specified based on first information detected by the detector;
determine that the feature amount is abnormal based on the detection number per unit time smaller than a threshold; and
control finish of detection for the first container based on determined abnormality of the feature amount.

2. The microparticle measuring device according to claim 1,
wherein the CPU is further configured to control display of a warning based on the determined abnormality of the feature amount.

3. The microparticle measuring device according to claim 1,
wherein the CPU is further configured to:
determine abnormality of the feature amount a determined number of times; and
control finish of the detection for the first container based on the determination that the feature amount is abnormal for the determined number of times.

4. The microparticle measuring device according to claim 1,
wherein the feature amount is the detection number per unit.

5. The microparticle measuring device according to claim 1,
wherein the threshold is a value specified based on the detection number per unit time after a lapse of a determined time from a start of the detection for the first container.

6. The microparticle measuring device according to claim 1,
wherein the CPU is further configured to determine that abnormality of the feature amount is based on a mixture of a bubble.

7. The microparticle measuring device according to claim 6, wherein
the detector is further configured to detect that a trigger time is above a threshold time (Tth),
the feature amount is a ratio (R) per unit time of a waveform pulse in which the trigger time is above the threshold time (Tth), and
the CPU is further configured to determine that the abnormality is based on the mixture of the bubble based on the ratio (R) that exceeds the threshold.

8. The microparticle measuring device according to claim 7,
wherein the threshold is a value (Rth) based on a size of the microparticle of the plurality of microparticles.

9. The microparticle measuring device according to claim 6, further comprising:
a detection flow path through which the microparticle of the plurality of microparticles flows; and
a drainage flow path connecting the detection flow path and a drainage container, wherein
the CPU is further configured to control drainage of the bubble from the detection flow path and the drainage flow path to the drainage container based on the determination that the abnormality is based on the mixture of the bubble.

10. The microparticle measuring device according to claim 6,
wherein, in a case where the abnormality is based on the mixture of the bubble, the CPU is further configured to analyze the microparticle of the plurality of microparticles and eliminate second information from the first information detected by the detector, wherein
the second information is detected at a time of detection of the bubble and up to a determined time point, and
the determined time point is a time before start of the detection of the bubble.

11. The microparticle measuring device according to claim 1, wherein
the CPU is further configured to control display that the detection for the first container is finished, and
the detection for the first container is finished based on the detected abnormality of the feature amount for the first container.

12. The microparticle measuring device according to claim 1,
wherein the CPU is further configured to control the detector finish the detection for the first container.

13. The microparticle measuring device according to claim 1, wherein:
the CPU is further configured to:
control finish of flow of a liquid from the first container; and control finish of the detection for the first container based on the finish of the flow of the liquid, and the liquid contains the plurality of microparticles.

14. The microparticle measuring device according to claim 1, wherein:

the CPU is further configured to control start of flow of a liquid from a second container of the plurality of containers based on the finish of the detection the first container.

15. The microparticle measuring device according to claim 6, wherein the CPU is further configured to control display that the detection for the first container is finished, and the detection for the first container is finished based on the determination that the abnormality is based on the mixture of the bubble for the first container.

16. A microparticle measuring method, comprising:

detecting light from a microparticle of a plurality of microparticles sent from a container of a plurality of containers containing the plurality of microparticles;

specifying a feature amount related to a detection number in a determined time period based on information, wherein the information is detected based on the detection of the light;

determining that the feature amount is abnormal based on the detection number per unit time smaller than a threshold; and controlling finish of detection for the container based on determined abnormality of the feature amount.

* * * * *